United States Patent
Schutsky et al.

(10) Patent No.: US 10,544,792 B2
(45) Date of Patent: Jan. 28, 2020

(54) MOLTEN METAL TRANSFER PUMP

(71) Applicant: JOINT STOCK COMPANY "AKME-ENGINEERING", Moscow (RU)

(72) Inventors: Sergey Yurievich Schutsky, St.Petersburg (RU); Andrei Nikolaevich Agrinskiy, St.Petersburg (RU); Nikolai Nikolaevich Pavlov, St.Petersburg (RU); Alexander Nikolaevich Bykov, St.Petersburg (RU); Boris Valentinovich Orlov, St.Petersburg (RU); Nikita Igorevich Simonov, St.Petersburg (RU)

(73) Assignee: JOINT STOCK COMPANY "AKME-ENGINEERING" (RU)

( * ) Notice: Subject to any disclaimer, the term of this patent is extended or adjusted under 35 U.S.C. 154(b) by 163 days.

(21) Appl. No.: 15/528,227

(22) PCT Filed: Nov. 16, 2015

(86) PCT No.: PCT/RU2015/000790
§ 371 (c)(1),
(2) Date: May 19, 2017

(87) PCT Pub. No.: WO2016/080866
PCT Pub. Date: May 26, 2016

(65) Prior Publication Data
US 2017/0321710 A1   Nov. 9, 2017

(30) Foreign Application Priority Data

Nov. 19, 2014  (RU) .................................. 2014146270

(51) Int. Cl.
*F04D 29/046*  (2006.01)
*F04D 7/06*  (2006.01)
(Continued)

(52) U.S. Cl.
CPC ........... *F04D 29/046* (2013.01); *B22D 39/00* (2013.01); *F04D 7/065* (2013.01); *F04D 29/043* (2013.01); *F04D 29/061* (2013.01)

(58) Field of Classification Search
CPC ........... F27D 2003/0054; F27D 27/005; F04D 7/065; F04D 29/047; F04D 7/00;
(Continued)

(56) References Cited

U.S. PATENT DOCUMENTS 3,630,529 A * 12/1971 Ball ........................ F04D 7/065
277/419
4,475,866 A * 10/1984 Kambe ................. F04D 29/047
415/112
(Continued)

FOREIGN PATENT DOCUMENTS

RU   2190127 C2   9/2002
RU   73924 U1   6/2008

*Primary Examiner* — Dominick L Plakkoottam
(74) *Attorney, Agent, or Firm* — Colin P. Cahoon; Carstens & Cahoon, LLP

(57) ABSTRACT

Molten metal transfer pump, in which a shaft (4) with the impeller (5) mounted on the shaft (4) is installed on the upper bearing (2) and the lower journal plain bearing (3). The lower journal plain bearing (3) has rotor (15) and stator (16) parts. The rotor part (15) is made in the form of two split bushings (17) mounted on the shaft (4), and the stator part (16) is made in the form of two split bushings (18) fixed in the cage (19) in axial alignment with the shaft (4). Bushings (17) (18) are fixed correspondingly with flat rings (24) (33) and composed of cylinder segments (20), (28) equidistantly placed in a circumferential direction, located correspondingly in the cylindrical groove (21) on the shaft and cylindrical groove (29) of the cage (19) and fixed with cone hold-down rings (22), (30) radially, and with spring rings (23), (31) axially.

3 Claims, 4 Drawing Sheets

(51) Int. Cl.
*F04D 29/043* (2006.01)
*F04D 29/06* (2006.01)
*B22D 39/00* (2006.01)

(58) Field of Classification Search
CPC ............. F04D 29/0413; F04D 29/0462; F04D 29/0465; F04D 29/049; B22D 39/00; B22D 17/30; B22D 37/00
USPC ................ 417/423.3, 423.11, 423.14, 424.1; 266/235
See application file for complete search history.

(56) References Cited

U.S. PATENT DOCUMENTS

| | | | | |
|---|---|---|---|---|
| 6,524,006 B1 * | 2/2003 | Lee | ........................ | F16C 17/045 384/107 |
| 2008/0253905 A1 * | 10/2008 | Morando | ................ | F04D 7/065 417/321 |
| 2013/0068412 A1 * | 3/2013 | Tipton | ................... | B22D 17/02 164/133 |

* cited by examiner

MOLTEN METAL TRANSFER PUMP

FIELD OF THE INVENTION

The invention relates to nuclear power industry, and more particularly to design of a pump providing for circulation of liquid metal coolant in the primary circuit of nuclear power plants.

BACKGROUND OF THE INVENTION

The prior art discloses a molten metal transfer pump (see patent RU 68077, IPC F04D 7/00, F04D7/06, F04D29/00, F04D29/04, issued on Nov. 10, 2007), comprising a case, an impeller, mounted on the shaft, connected to the drive and enclosed in the case by means of the upper and lower bearings, with the lower journal plain bearing made of structural ceramics resistant to thermal and corrosion effect of molten metal, more specifically, of self-bonded silicon carbide or silicone nitride, or oxide ceramics based on the aluminum oxide.

The prior art pump has a longer operational life of the wet end under conditions of thermal and corrosion effect of molten metal; however, technologically it is extremely difficult to manufacture the lower journal plain bearing of structural ceramics.

The prior art discloses a molten metal transfer pump (see U.S. Pat. No. 4,475,866, IPC F01D 25/14; F04D 7/00; F04D 7/06, F04D 29/04; F04D 29/047, issued on Oct. 9, 1984) which includes a cylindrical case, drive-connected shaft, located vertically along the axis of the case, and hydrostatic plain bearing supporting the lower part of the shaft together with the impeller. The plain bearing includes a rotor part in the form of cylindrical clutch mounted on the shaft, and stator part in the form of cylindrical bushing with radial holes meant for supply of molten metal to the sliding surfaces of the bearing. The rotor and stator parts of the bearing are made of stainless steel while their sliding surfaces are made of stellite (cobalt-chromium-tungsten alloy).

Disadvantage of this prior art pump is the possibility of tearing of mating surfaces at pump operation during non-steady-state modes.

The prior art discloses a molten metal transfer pump (see U.S. Pat. No. 5,685,701, IPC F04D29/04, F04D7/00, F04D7/06, issued on Nov. 11, 1997), comprising a pump chamber, drive-connected shaft made of fire-proof material including graphite with radial bearing surface, and a bucket wheel, fixed on the shaft end. The shaft is installed in the pump chamber using the upper and lower bearings. The lower journal plain bearing is made in the form of two silicon carbide rings having a rectangular cross section and enclosed in the case. The pump is meant for transfer of liquid zinc and aluminum.

Disadvantage of this prior art pump is the complexity of manufacturing of mating rings of silicon carbide.

The prior art discloses a molten metal transfer pump (see patent RU 73924, IPC F04D 1/00, IPC F04D 3/00, issued on Jun. 10, 2008), comprising a case, in which a shaft with a mounted impeller is installed on the upper rolling bearing, located above the level of liquid metal, and on the lower plain bearing, located under the level of liquid metal. The lower plain bearing is made in the form of two successively mounted bushings (separated by a chamber) of the shaft with curved channels on their cylindrical surfaces forming a labyrinth screw pump. Direction of swirl of the channels of one surface of the shaft bushing is the same as the direction of shaft rotation, and direction of the channels of the other surface is opposite to it. Shaft bushings are interconnected with two successively mounted bearing bushings installed in the case in axial alignment with the shaft. Bearing bushings are fitted with curved channels located on their inner cylindrical surface with the direction of swirl opposite to the direction of swirl of the channels on the mating opposite surfaces of shaft bushings.

Disadvantage of this prior art pump is the complexity of manufacturing of shaft bushings and bearing bushings with curved channels on the surface, as well as the wear of helical surfaces between the channels of shaft and bearing bushings in case of misalignment between the axes of the upper bearing and lower plain bearing.

The prior art discloses a molten metal transfer pump (see application US 2013068412, IPC B22D 23/00, B22D 39/02, F04D 3/00, issued on Mar. 21, 2013), congruent with the claimed solution in the most of essential features and taken as a prototype. The prior art prototype pump comprises a case, impeller, mounted on the shaft, connected to the drive and enclosed in the case by means of the upper and lower bearings. The lower journal plain bearing is comprised of stator and rotor parts. The stator part of the lower journal plain bearing is made in the form of two bushings spaced along the axis of the shaft and installed in the case in axial alignment with the shaft; the rotor part of the lower journal plain bearing is made in the form of two shaft-mounted bushings lying opposite to the bushings of the stator part. The bushings of the stator and rotor parts of the lower journal bearing are made of silicon carbide based ceramics.

Disadvantage of this prior art pump is the complexity of manufacturing of mating bushings of silicon carbide based ceramics, as well as the possibility of tearing of material of bushings made of silicon carbide based ceramics at pump startup and its operation at low speed.

SUMMARY OF THE INVENTION

The purpose of this solution was to create a molten metal transfer pump with an easy-to-manufacture design of the lower journal bearing and exclude the possibility of its tearing, thus providing for improved reliability of the pump at its operation.

Technical results achieved at the use of the present invention are, among others, exclusion of the possibility of tearing in the lower journal bearing and provision of improved reliability of pump at its operation.

This purpose is achieved by the proposed design of the molten metal transfer pump.

Achieving of each of the claimed technical results is affected by the following features of the invention claimed. Molten metal transfer pump comprises a case, in which a shaft with a mounted impeller is installed on the upper bearing and lower journal plain bearing. The lower journal plain bearing is comprised of rotor and stator parts. The rotor part is made in the form of two bushings mounted on the shaft, and the stator part is made in the form of two bushings fixed in the cage in axial alignment with the shaft. Bushings of the rotor and stator parts are fixed with flat rings. Bushings of the rotor and stator parts have mating sliding surfaces and are made of silicon carbide based ceramics. New feature of the pump is milling of multiple-thread opposed helical grooves forming a labyrinth screw pump under the lower journal plain bearing in the opposite areas of the surface of the shaft and case, as well as manufacturing of bushings of the rotor and stator parts in the form of split bushings composed of cylinder segments equidistantly placed in a circumferential direction and located correspondingly in the cylindrical groove of the shaft and cylindrical groove of the cage, and fixed with cone hold-down rings radially, and with spring rings axially, providing for axial pressing force.

The rotor part of the lower journal plain bearing may be made with self-aligning segments, for which purpose each segment is resiliently pressed with a band spring located in the groove on the back surface of the segment and in the opposite groove of the shaft.

The labyrinth screw pump formed above the lower journal plain bearing provides for a reliable mode of liquid friction on the opposite surfaces of the rotor and stator parts of the bearing, bushings of which are made in the form of cylinder segments placed in a circumferential direction, and excludes the possibility of tearing of material of segments of bushings made of silicon carbide based ceramics. Designing of bushings in the form of split bushings composed of cylinder segments equidistantly placed in a circumferential direction significantly facilitates their manufacturing of ceramics, for example, of silicon carbide based ceramics.

BRIEF DESCRIPTION OF THE DRAWINGS

The present molten metal transfer pump is illustratively described in the drawing, where.

Figure 2:
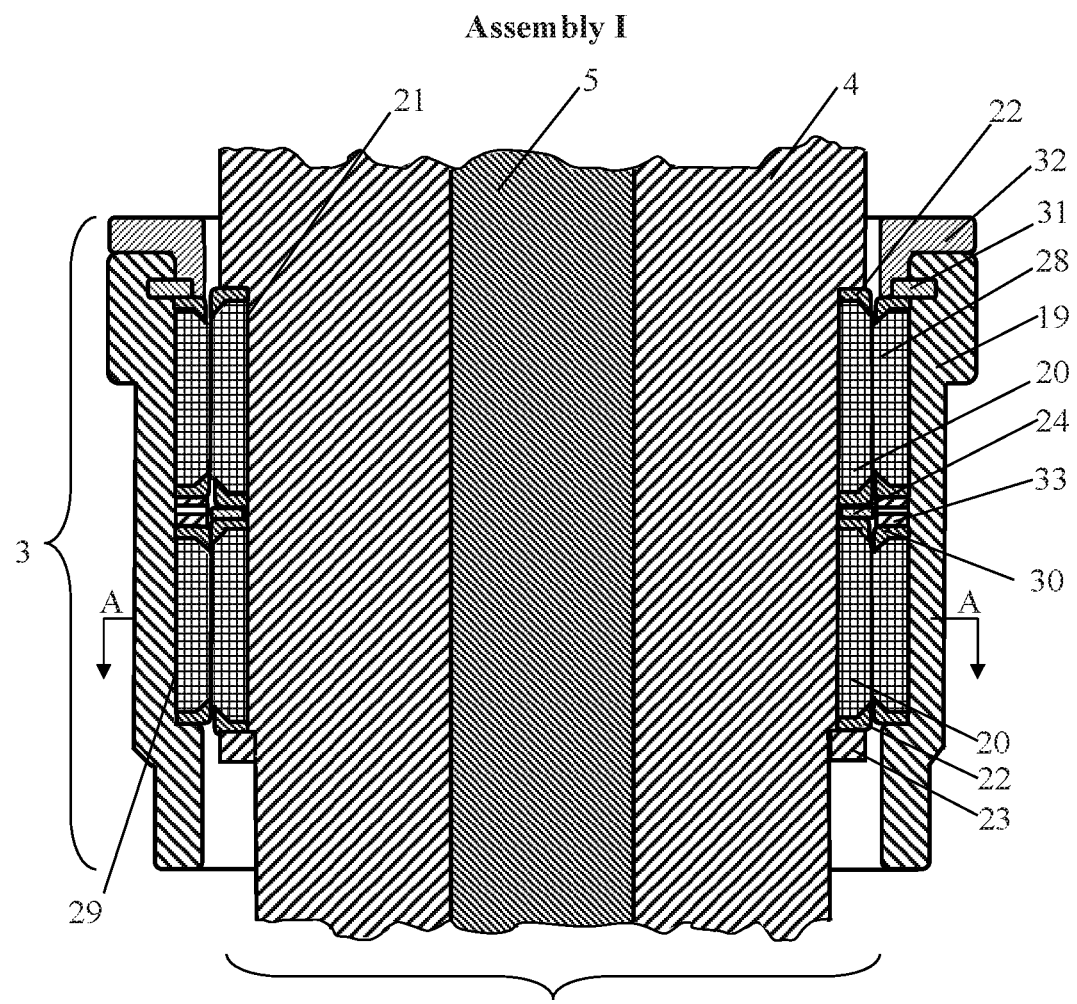
FIG. 2 shows the lower journal plain bearing assembly in transverse section (assembly I, shown in FIG. 1)
Figure 3:
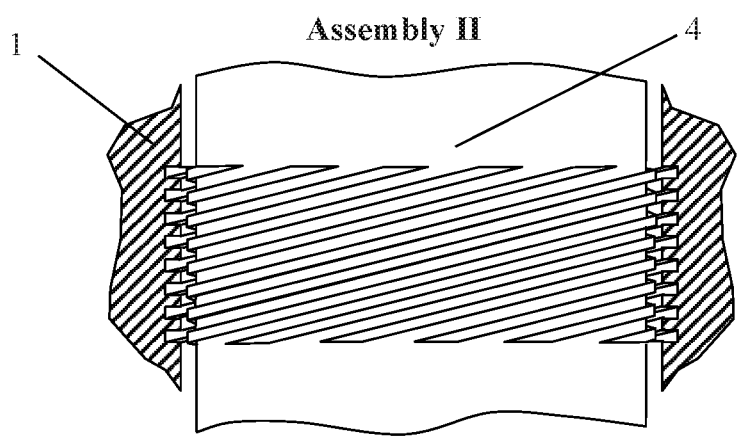
FIG. 3 shows the labyrinth screw pump formed by multi-thread opposing spiral grooves at the shaft and in the casing of the pump (assembly II, shown in FIG. 1)

The molten metal transfer pump (see FIG. 1) is intended for ensuring circulation of liquid metal coolant (for example, eutectic alloy of lead and bismuth) in the primary circuit of nuclear reactor plant and comprises a case 1, in which the shaft 4 with axial-type impeller 5 mounted on the shaft 4 is placed on the water lubricant of the upper journal supporting bearing 2 and in the liquid metal coolant medium of the lower journal plain bearing 3; an axial-flow type impeller 5 is fixed on the shaft 4. In the case 1 above the impeller 5 an inlet guide vane 6 is located. Below the impeller 5 there is an outlet guide vane 7 with a baffle 8 meant for stabilization of liquid metal coolant flow coming out of the pump. Under the lower journal plain bearing 3 there is a labyrinth screw pump formed by multiple-thread opposing spiral grooves at shaft 4 and on casing surface 1 (FIG. 3). Liquid metal coolant flows to the labyrinth screw pump 9 through channel 10. Higher along the shaft 4 in case 1 the following components are located: thermal barriers 11, thermal protection unit 12, cooler 13 of the shaft 4 and magnetic liquid seal 14. The upper end of the shaft is connected to the drive, for example, by means of a coupling torsion sleeve (not shown in the drawing). The drive may be in the form, for example, of a gas-tight fire-safe electric motor. The lower journal plain bearing 3 has rotor part 15 (see FIG. 2) and stator part 16 (see FIG. 4). The rotor part 15 is made in the form of two split bushings 17 mounted on the shaft 4, and the stator part 16 is made in the form of two split bushings 18 fixed in the cage 19 in axial alignment with the shaft 4.

Split bushings 17 of the rotor part 15 (see FIG. 5) are composed of cylinder segments 20 equidistantly placed in a circumferential direction (see 7 segments 20 in FIG. 3), located in the cylindrical groove 21 of the shaft 4 (see FIG. 2) and fixed with cone hold-down rings 22 radially, and with spring rings 23 axially, providing for axial pressing force. Between the split bushings 17 of the rotor part 15 there is a flat ring 24 meant for fixation of the bushings 17 with segments 20. Segments 20 of the rotor part 15 may be made in the form of self-aligning segments. In this embodiment each segment 20 can be resiliently pressed with a band spring 25 located in the groove 26 of the back surface of the segment 20 and in the opposite groove 27 of the shaft 4. Such design allows compensating the differences in thermal expansion of parts made of steel and ceramics. Split bushings 18 of the stator part 16 (see FIG. 4) are made in the form of split bushings and composed of cylinder segments 28 equidistantly placed in a circumferential direction (see 11 segments 28 in FIG. 3) located in the cylindrical groove 29 of the cage 19 and fixed with cone hold-down rings 30 radially, and with a spring ring 31 pressed with the upper bushing 32 axially. Between the split bushings 18 of the stator part 16 there is a flat ring 33 with through radial slots 34 meant for segments 28 fixation and providing for lubrication of segments 28 at the moment of pump startup. Segments 20, 28 of split bushings 17, 18 of the rotor and stator parts 15, 16 have mating sliding surfaces and are made of silicon carbide based ceramics.

DETAILED DESCRIPTION

Figure 1:
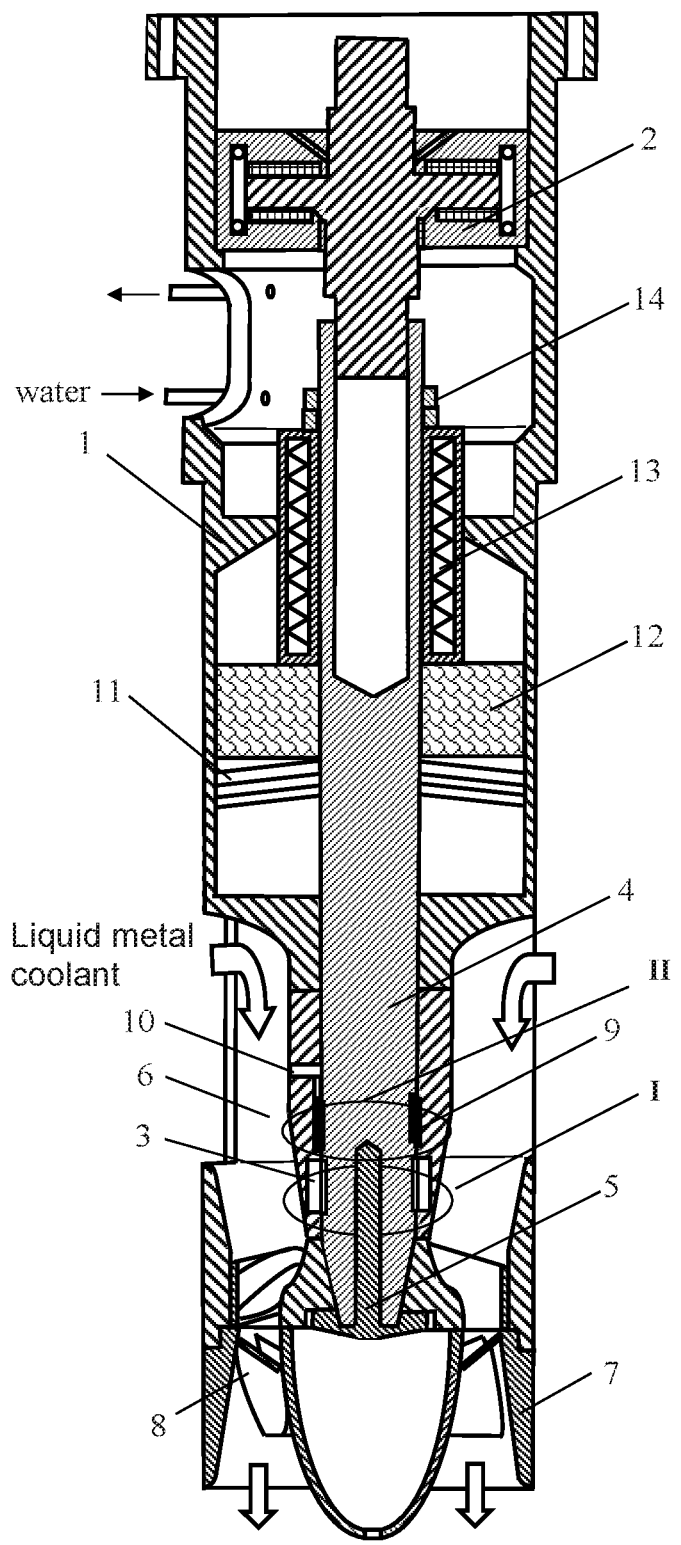
FIG. 1 shows a schematic general view of the molten metal transfer pump in longitudinal section.
Figure 4:
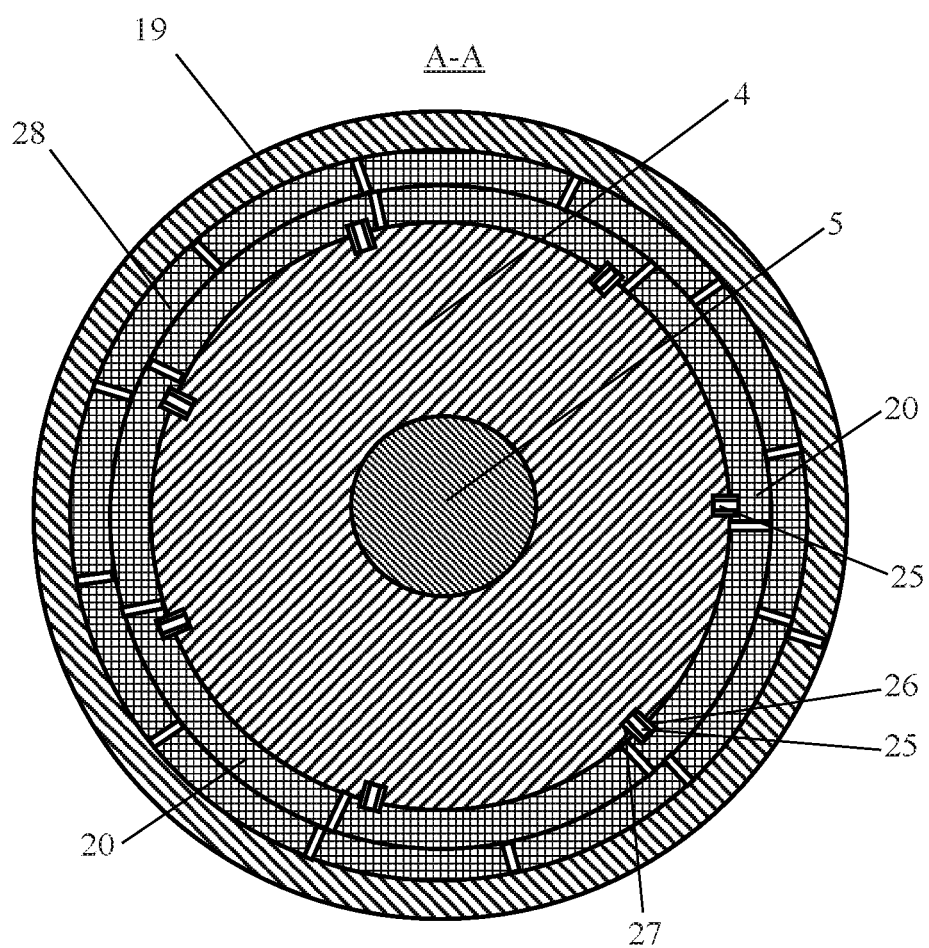
FIG. 4 shows the transverse A-A section of the lower journal plain bearing assembly.
Figure 5:
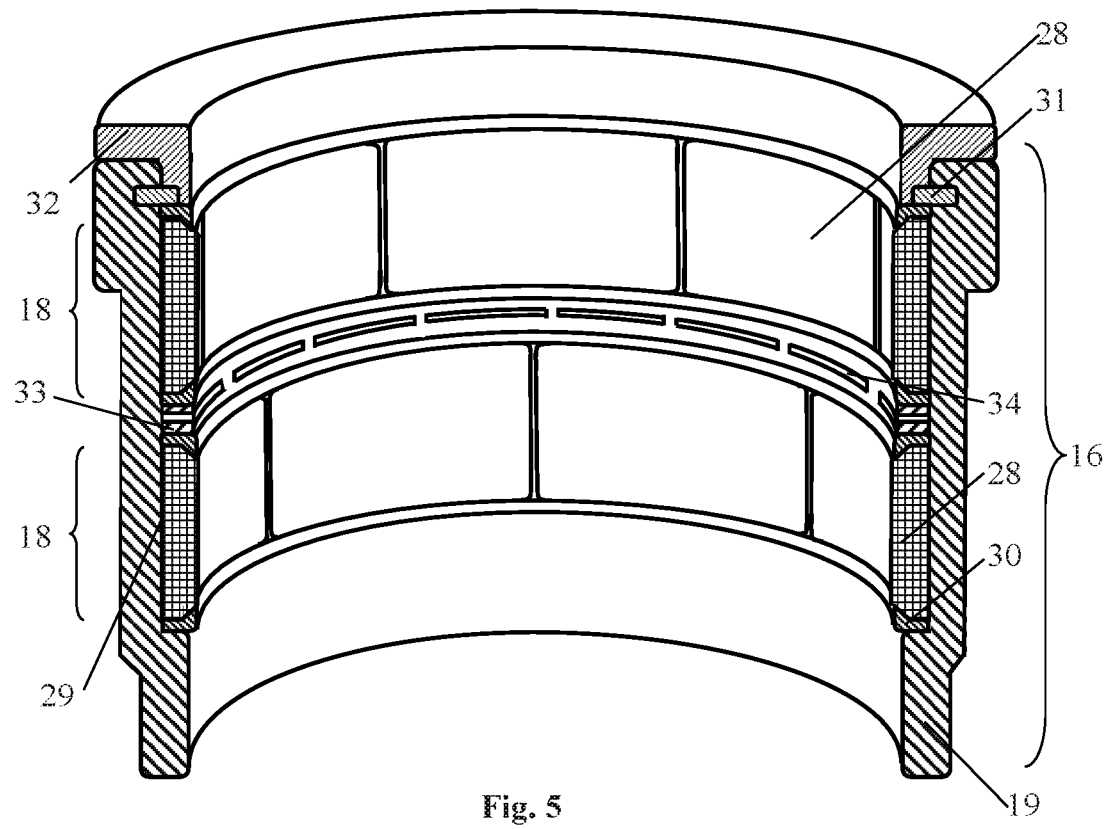
FIG. 5 shows an axonometric view of the stator part of the lower journal plain bearing.
Figure 6:
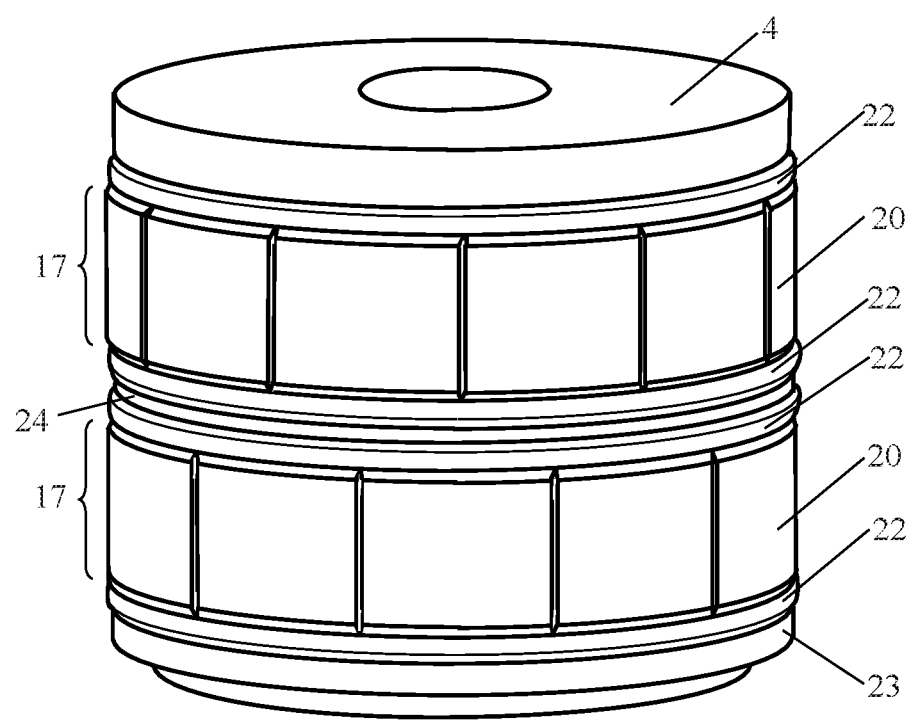
FIG. 6 shows an axonometric view of the rotor part of the lower journal plain bearing assembled with the shaft.

FIG. 3 shows the labyrinth screw pump formed by multi-thread opposing spiral grooves at the shaft and in the casing of the pump (assembly II, shown in FIG. 1);

FIG. 4 shows the transverse A-A section of the lower journal plain bearing assembly;

FIG. 5 shows an axonometric view of the stator part of the lower journal plain bearing; and FIG. 6 shows an axonometric view of the rotor part of the lower journal plain bearing assembled with the shaft.

The molten metal transfer pump (see FIG. 1) is intended for ensuring circulation of liquid metal coolant (for example, eutectic alloy of lead and bismuth) in the primary circuit of nuclear reactor plant and comprises a case 1, in which the shaft 4 with axial-type impeller 5 mounted on the shaft 4 is placed on the water lubricant of the upper journal supporting bearing 2 and in the liquid metal coolant medium of the lower journal plain bearing 3; an axial-flow type impeller 5 is fixed on the shaft 4. In the case 1 above the impeller 5 an inlet guide vane 6 is located. Below the impeller 5 there is an outlet guide vane 7 with a baffle 8 meant for stabilization of liquid metal coolant flow coming out of the pump. Under the lower journal plain bearing 3 there is a labyrinth screw pump formed by multiple-thread opposing spiral grooves at shaft 4 and on casing surface 1 (FIG. 3). Liquid metal coolant flows to the labyrinth screw pump 9 through channel 10. Higher along the shaft 4 in case 1 the following components are located: thermal barriers 11, thermal protection unit 12, cooler 13 of the shaft 4 and magnetic liquid seal 14. The upper end of the shaft is connected to the drive, for example, by means of a coupling torsion sleeve (not shown in the drawing). The drive may be in the form, for example, of a gas-tight fire-safe electric motor. The lower journal plain bearing 3 has rotor part 15 (see FIG. 2) and stator part 16 (see FIG. 4). The rotor part 15 is made in the form of two split bushings 17 mounted on the shaft 4, and the stator part 16 is made in the form of two split bushings 18 fixed in the cage 19 in axial alignment with the shaft 4. Split bushings 17 of the rotor part 15 (see FIG. 5) are composed of cylinder segments 20 equidistantly placed in a circumferential direction (see 7 segments 20 in FIG. 3), located in the cylindrical groove 21 of the shaft 4 (see FIG. 2) and fixed with cone hold-down rings 22 radially, and with spring rings 23 axially, providing for axial pressing force. Between the split bushings 17 of the rotor part 15 there is a flat ring 24 meant for fixation of the bushings 17 with segments 20. Segments 20 of the rotor part 15 may be made in the form of self-aligning segments. In this embodiment each segment 20 can be resiliently pressed with a band spring 25 located in the groove 26 of the back surface of the segment 20 and in the opposite groove 27 of the shaft 4. Such design allows compensating the differences in thermal expansion of parts made of steel and ceramics. Split bushings 18 of the stator part 16 (see FIG. 4) are made in the form of split bushings and composed of cylinder segments 28 equidistantly placed in a circumferential direction (see 11 segments 28 in FIG. 3) located in the cylindrical groove 29 of the cage 19 and fixed with cone hold-down rings 30 radially, and with a spring ring 31 pressed with the upper bushing 32 axially. Between the split bushings 18 of the stator part 16 there is a flat ring 33 with through radial slots 34 meant for segments 28 fixation and providing for lubrication of segments 28 at the moment of pump startup. Segments 20, 28 of split bushings 17, 18 of the rotor and stator parts 15, 16 have mating sliding surfaces and are made of silicon carbide based ceramics.

The present molten metal transfer pump operates as follows. Prior to its filling with liquid metal coolant, the reactor monoblock unit is to be warmed. Then the primary circuit of the reactor monoblock unit is filled with liquid metal coolant and drained. Chemically demineralized water with the temperature of 15-40° C. is supplied to the cooler 13 and the upper journal supporting bearing 2, after which the shaft 4 is switched on. By the action of the impeller 5 liquid metal coolant flows to the inlet guide vane 6 and then is fed by means of the impeller 5 to the outlet guide vane 7 with a baffle 8. At the same time liquid metal coolant coming through channel 10, is pumped with the labyrinth screw pump 9 to the end of the lower journal plain bearing 3, providing for reliable mode of liquid friction on the opposite surfaces of segments 20, 28 of split bushings 17, 18 of rotor and stator parts 15, 16 of the bearing 3 as well as for non-tearing operation of the bearing.

The invention claimed is:

1. A molten metal transfer pump comprising
a case, in which a drive-connected shaft with a mounted impeller is installed on an upper bearing and a lower journal plain bearing; the lower journal plain bearing comprises a rotor part and a stator part;
the rotor part is made in the form of two bushings, mounted on the shaft, and the stator part is made in the form of two bushings fixed in a cage in axial alignment with the shaft;
bushings of the rotor and stator parts have mating sliding surfaces and are made of silicon carbide based ceramics, the pump is characterized in that above the lower journal plain bearing, multiple-thread opposing spiral grooves are milled in a shaft area of a surface of the shaft and a case area of a surface of the case forming a labyrinth screw pump;
wherein the rotor part comprises split bushings and the stator part comprises split bushings;
wherein a rotor flat ring is disposed between the split bushings of the rotor part;
wherein a stator flat ring is disposed between the split bushings of the stator part;
wherein each of the split bushings are composed of cylinder segments configured to fix onto each of the flat rings and are equidistantly placed in a circumferential direction, the cylinder segments of the rotor split bushings are located correspondingly in a cylindrical groove of the shaft and the cylinder segments of the stator split bushings of the stator are located in a cylindrical groove of the cage and each of the cylinder segments are fixed with cone hold-down rings radially, and with spring rings axially, providing for axial pressing force.

2. The pump according to claim 1 wherein the cylinder segments of the rotor part are self-aligning segments, wherein the pump comprises a plurality of band springs, for which purpose each segment is resiliently pressed with one of a plurality of band springs located in a groove of a back surface of each segment and opposite groove of the shaft.

3. The pump according to claim 1 wherein the rotor flat ring comprises through radial slots; and
wherein the stator flat ring comprises through radial slots.

* * * * *